United States Patent [19]
Kuntze

[11] 3,939,458
[45] Feb. 17, 1976

[54] METHOD FOR THE TABULATOR-LIKE ILLUSTRATION OF SYMBOLS

[75] Inventor: Rudolf Kuntze, Otterfing, Germany

[73] Assignee: Siemens Aktiengesellschaft, Berlin & Munich, Germany

[22] Filed: Jan. 7, 1974

[21] Appl. No.: 431,420

[30] Foreign Application Priority Data
Jan. 10, 1973 Germany............................ 2301104

[52] U.S. Cl............................. 340/324 A; 340/172.5
[51] Int. Cl.²............................................. G06F 3/14
[58] Field of Search................. 340/324 A, 324 AD

[56] References Cited
UNITED STATES PATENTS

| | | | |
|---|---|---|---|
| 3,346,853 | 10/1967 | Koster et al. | 340/324 A |
| 3,614,766 | 10/1971 | Kievit | 340/324 AD |
| 3,675,208 | 7/1972 | Bard | 340/324 A |
| 3,816,823 | 6/1974 | Manber | 340/324 AD |

Primary Examiner—David L. Trafton
Attorney, Agent, or Firm—Hill, Gross, Simpson, Van Santen, Steadman, Chiara & Simpson

[57] ABSTRACT

A method and apparatus for effecting the display of symbols, in tabulated form, on the screen of a data-video device, utilizing a data source, an image repetition store and a symbol generator, in which data is fed by the data source identifying the area of the screen in which a tabulator mark is to be depicted, with the symbol generator releasing signals operative to effect the desired display of the tabulator mark. Control may be effected by means of control words from the data source for "tabulator set", "tabulator cancel", and "tabulator advance", as well as for cancellation of tabulator marks of a line, or cancellation of all symbols with the exception of tabulator marks. A writing mark may be employed in connection with the designation and display of a tabulator mark, and the tabulator marks may be disposed in areas with or without the display of symbols therewith. The invention is particularly adapted to applications involving the so-called "rolling-page method" of display.

13 Claims, 7 Drawing Figures

METHOD FOR THE TABULATOR-LIKE ILLUSTRATION OF SYMBOLS

BACKGROUND OF THE INVENTION

The invention is directed to a method and apparatus for the illustration of symbols, in tabulated arrangement, on the screen of a data-video device, in which symbol words corresponding to the symbols to be illustrated, are released by a data source, and, in conjunction with an image repetition store and a symbol generator, subsequently illustrated.

Tabulator mechanisms are generally known in conjunction with typewriters, by operation of which mechanism writing of columns of data is facilitated. In such mechanism, initially a tabulator indicator or its equivalent is adjustably adjusted exteriorly of the writing area, to the corresponding point at which the second column is to form. Following the writing of a word or symbol in a first column, a tabulator key may be actuated, as a result of which the carriage transporting the writing surface, or transporting the type mechanism, advances in a single jump, movement, to the desired tabulated position, whereby the entry into the second column can immediately take place without an undesirable loss of time.

The invention is directed to the problem of achieving a method and apparatus for achieving a similar tabulator operation with respect to the illustration of symbols on the screen of a data-video device, particularly wherein such symbols are supplied and written in accordance with the so-called rolling-page method in which the data depicted on the screen appears to be continuously moving in a vertical direction, usually upwardly.

SUMMARY OF THE INVENTION

In the practice of the invention, electronically produced tabulator marks are depicted on the screen of the data-video device which considerably facilitate the writing of symbols on such screen. In accordance with the invention, data is fed by the data source employed which indicates in which area of the screen a tabulator mark is to be depicted. In addition, signals are released by a symbol generator which effect the desired display of the tabulator mark.

In order to achieve a relatively rapid tabulated writing of the symbols, it is advantageous to feed an order or control word "tabulator advance" from the data source, which causes a continuous increase in the address of a writing mark in column direction. By the utilization of a decoder, a signal may be derived which terminates the continuous increase of the address when the tabulator mark is displayed.

To enable display of a tabulator mark with a minimum technical expenditure, it is advisable to feed, with the data, a tabulator word corresponding to the tabulator mark which is to be displayed into the image repeat storer. The symbol word and the tabulator word are thus conducted from the image repetition store to the symbol generator and the respective symbols or the respective tabulator mark, are displayed on the screen.

If the symbols are written in accordance with the rolling-page method, it is advisable to display the tabulator mark during the writing in of the last line as well as in the first line. The tabulator marks remain visible in the first line as long as desired, if shortly prior to the writing of the symbols into the line located above, all tabulator words are fed at those points of the image repetition store which correspond to the second line.

If the area available on the screen is to be especially effectively utilized, and in an area which is normally only available for alphanumerical symbols, tabulator marks are to be additionally written in, it is advisable to provide a tabulator store which contains information as to which areas of the screen, tabulator marks are to be inserted. Such a tabulator store preferably is designed as a circulating memory so that its data synchronously circulates with the words released by the image repetition store. The electronbeam is thereafter deflected, by utilization of a symbol generator, along the points of the alphanumerical symbol to be written, as well as along the point of the tabulator mark, and the light-scanning of the cathode beam is effected during the writing of the tabulator marks by means of the tabulator storer.

BRIEF DESCRIPTION OF THE DRAWINGS

In the drawings, wherein like reference characters indicate like or corresponding elements.

DETAILED DESCRIPTION OF PREFERRED EMBODIMENTS

Figure 1:
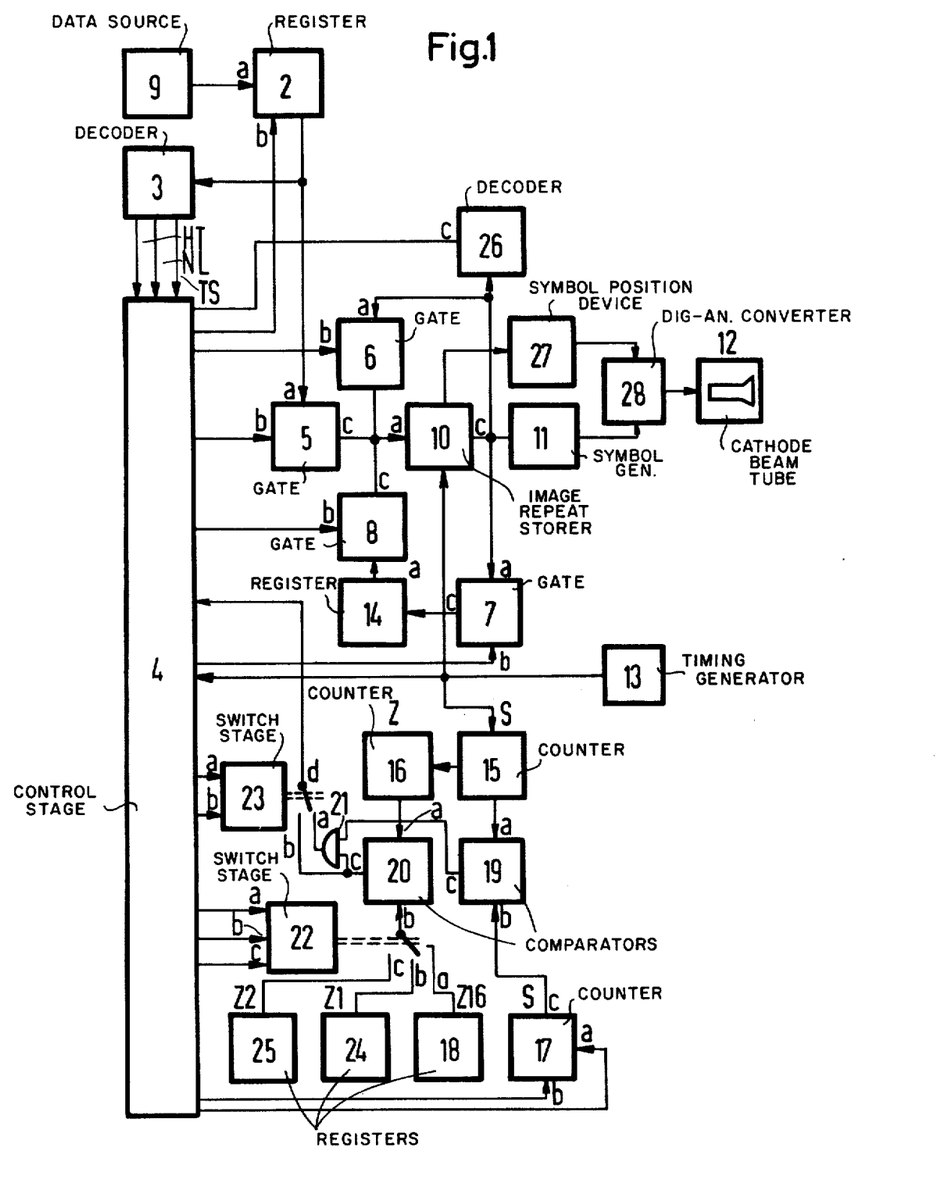
FIG. 1 illustrates, in block form, a circuit arrangement for the display of symbols in tabulated arrangement on the screen of a data-video device, in which, for each area, either a symbol or a tabulator mark may be illustrated.

The circuit arrangement illustrated in FIG. 1 comprises a data source 9, a register 2, a decoder 3, control stage 4, gates 5, 6, 7 and 8, image repetition store 10, symbol generator 11, cathode beam tube 12, timing generator 13, register 14, counters 15, 16 and 17, registers 18, 24 and 25, comparators 19 and 20, switching stages 22 and 23, decoder 26, symbol positioning circuit or device 27, and a digital-analog converter 28.

Data is supplied from the data source 9 and fed, either parallel or in series, over the input $a$ into the register 2, in the form of words with seven bits each, in the CCITT No. 5 code. In the presence of a signal at the input $b$, contents of register 2 are cancelled. If a fed word characterizes a specific symbol which is to be illustrated on the screen of the cathode beam tube 12, such work will be referred to in the following description as a "symbol word", by means of which alphanumerical and graphic symbols can be depicted. In addition to such symbol words, order or control words are also fed from the data source 9 which have an influence on the symbol to be depicted. For example, by means of such control words, individual symbols can be cancelled and rewritten at a different point on the screen of the cathode beam tube 12. While a data processing arrangement can be employed as the data source 9, it will be apparent that other supply arrangements can be employed, for example, those employing a keyboard to release the desired data.

The output of the register 2 is operatively connected with the decoder 3 which releases signals to the control stage 4 upon receipt of control signals.

The gates 5, 6, 7 and 8 are operative to effect respective operable conductive connections between the input $a$ and the output $c$ thereof in dependency upon a signal which is supplied to the input $b$ of such gate. Binary values of the respective signals are referred to as 0-values and 1-values. The 0-signals or 1-signals thus correspond to the 0-value or the 1-value respectively, and the gates 5, 6, 7 and 8 are conductive in the presence of a 1-signal at the corresponding input $b$.

A circulating memory, for example, can be provided as an image repetition store 10, which continuously releases words over the output 10c thereof and restores them over the input 10a thereof, with circulation taking place synchronously with the timing pulses released by the timing generator 13.

Figure 2:
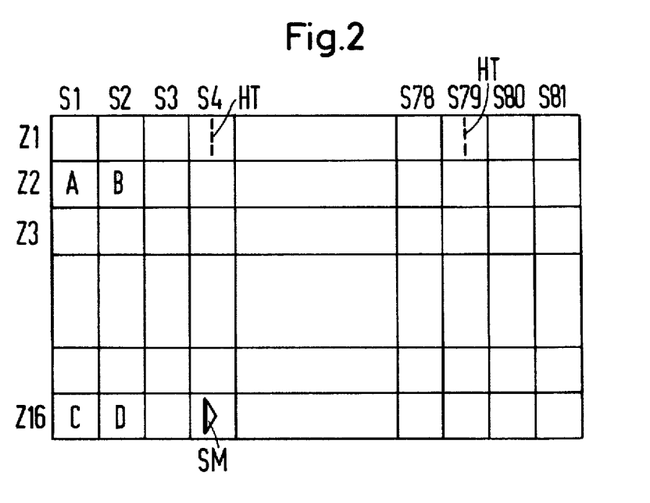
FIG. 2 illustrates the screen of a data-video device.

FIG. 2 schematically illustrates a screen whose area is subdivided into respective columns S1, S2, S3, S4 . . . S78, S79, S80, S81 and into lines Z1, Z2, Z3 . . . Z16. The columns S and lines Z thus define individual areas, each of which are adapted to display a single symbol. For example, the symbol $a$ is illustrated in the area S1/Z2, which area is then defined by the column S1 and by the line Z2. Thus 81·16 symbols can be displayed on the screen, with its 81 columns and 16 lines. Since each symbol is displayed approximately 50 times per second, 81·16 symbol words are released in each 50th of a second over the output 10c, each of which characterizes one of the symbols to be displayed. Such words are conducted to the symbol generator 11 which creates the necessary control signals associated with the particular symbol and which then so control the cathode beam of the tube 12 that the desired symbol, for example, the symbol A is actually displayed.

The counter 15, illustrated in FIG. 1, counts from 1 to 81 and then releases a pulse to the counter 16 which counts from 1 to 16. The timing pulses of the timing generator 13 are conducted to the image repetition store 10 as well as to the counter 15, and with each timing pulse a symbol word is released and the counter reading of at least one counter 15, 16, is correspondingly altered. The counter readings of the counter 15 characterize the column S while the counter readings of the counter 16 the line Z, and both counter readings indicate the address of the cell of the image repetition store 10, which, at this time, releases a symbol word over the output 10c. Such address is assigned to an area within which the symbols are to be displayed. The addresses of the cells of the image repetition store 10 thus can also be considered as addresses of the area S/Z of the screen illustrated in FIG. 2. If for example the counter 15 has reached 1, and the counter 16 has reached the reading of 2, the address of the cell is stored in the two counters 15 and 16, which thus are assigned to the area S1/Z2 for display of the symbol A.

The counter 17 counts from 1 to 81 and releases data over the output 17c thereof, which characterize the respective counter reading. Signals are conducted to the input $a$ thereof which effect a change in individual counter readings while reset signals are adapted to be supplied to the input 17b thereof for effecting resetting of the counter.

The registers 18, 24 or 25 respectively release data which characterizes the numbers 16 or 1 or 2 respectively and the individual addresses of lines thus can be changed by means of the counter 17 and registers 18, 24 and 25.

The switching stage 22 is adapted to set any one of the switch positions 22a, 22b and 22c. More specifically, the switch position 22a, 22b or 22c, are respectively set if a signal is received over a corresponding input 22a, 22b or 22c. Likewise, the switching stage 23 can be set in either of two switch positions 23a or 23b, either of the positions being set when a signal is received on the corresponding input 23a or 23b, with the signals being supplied to either switching stage from the control stage 4. Suitable electronic switches may be employed for the respective switching stages 22 and 23.

Each of the comparators 19 and 20 is operated to release a signal at its output $c$ in the event coinciding addresses are supplied at the inputs $a$ and $b$ thereof. If the switch positions 22a and 23a are set, a signal is released over the contact 23b if the cell of the image repeat storer 10 is connected with the output 10c assigned to one single addressed area of the last line Z16. If the switch positions 22b and 23a are set, a signal is released over contact 23d, if the cell of the image repetition store 10 is connected with the output 10c assigned to a signal address area of the first line Z1. In the event the switch positions 22c and 23a are set, a signal is released over the contact 23d, if the cell of the image repetition store 10 is connected with the output 10c which is assigned to one single addressed area of the second line Z2. With a setting of switch position 23b, signals are released over contact 23d, only if the addresses of the lines coincide which are set, on one hand by the counter 16, and on the other hand by the registers 18, 24 or 25 respectively. Thus the address of the line Z16, Z1 or Z2 respectively can be set by the various switch positions 22a, 22b or 22c.

In considering the operation of the arrangement illustrated in FIG. 1, it is initially assumed that the symbols are displayed according to the known rolling-page method, beginning with the bottom line Z16 of FIG. 2. The address of the area S1/Z16 is set by the counter 17 and the register 18 with the writing marking word corresponding to the writing mark SM being stored in the register 2. With switch positions 22a and 23a being set, a signal is conducted to the control stage 4, utilizing comparators 19, 20 and the gate 21. The control stage 4 thus blocks the gate 6 and opens the gate 5 so that the writing marking word from register 2 is stored in the addressed cell of the image repetition store 10. The writing marker SM will thereby be displayed in the area S1/Z16. A subsequently fed symbol word is automatically stored into the cell in the image repetition store 10 in which the writing marking word was stored. For this purpose, the gate 6 is blocked for a brief period and the gate 5 opened, whereby the writing mark SM is shifted automatically, area by area towards the right. Thus, one symbol can be displayed in each of the zones of the line Z16, one after the other, in which previously the writing mark was displayed.

In the rolling-page method the symbols of the last line Z16 are displayed in the line Z15 located directly thereabove, and symbols can then be displayed in line Z16. In like manner, with such method, the symbols of line Z15 and Z16 are respectively displayed in lines Z14 and Z15 located directly above the same. In like manner a line of symbols eventually displayed in line Z1 and thereafter cancelled with the symbols displayed in line Z2 to Z16 thus being displayed in lines Z1 to Z15 respectively. Thus the symbols are always displayed in the last line Z16 and subsequently automatically entered into the preceding lines.

FIG. 2, in addition to illustrating symbols A, B, C, D, and the writing marks SM, illustrates tabulator marks HT, which are therein illustrated as each consisting of three interrupted lines. Such tabulator marks can also be displayed in line 16, as well as in line 1, and while such tabulator marks can be carried over into line Z/16 at any time, they remain continuously in line Z1 and facilitate the column-like writing of the symbols. Up to 80 tabulator marks can thus be displayed in the line Z1.

In connection with the feeding of the data, it is assumed that such data is supplied by the use of a keyboard whereby the tabulator marks can be determined by three keys, which may be respectively designated as "tabulator setting" key, "tabulator actuation" key and "tabulator cancellation" key. For the feed of the tabulator words, initially the writing mark SM is displayed in the area in which the tabulator mark HT is to appear, with the setting of the writing mark SM taking place in the manner previously described. At this point the tabulator set key is actuated whereby there is fed from the data source 1 the control word corresponding to the order tabulator set which is stored in the register 2, decoded by the decoder 3 and a signal conducted to the control stage 4 over the line designated HT. Thereafter the tabulator word is entered in the cell of the image repetition store 10 in which the writing marking word was previously stored, in a manner correspond to that for the symbol words. Thereafter, the tabulator mark is also displayed in line Z1. For this purpose, switch positions 22 b, 23a, are set and signals are released to the control stage 4 which causes a blocking of gate 6 and opening of the gate 5 whereby the tabulator mark is displayed in the area of the line Z1.

In order to insure that the tabulator mark HT will always be visible in the first line Z1, during operation in accordance with the rolling-page method, the address in line Z1 is set by means of the counter 17 and the register 24. During switch positions 22b and 23a, the control stage 4 causes the gate 7 to open and the tabulator words corresponding to the line Z1 are written word by word into the register 14. The switch position 22c is then set and a restoring of the tabulator words stored in the register 14 is effected in the image repetition store 10. The tabulator words are thus stored at the cell assigned to the line Z2. Subsequently, in the course of the rolling-page method, all symbols are illustrated in the previous line so that now the tabulator marks HT will again be visible in line Z1.

If additional tabulator marks are to be displayed, the writing mark SM is shifted in line Z16 towards the right until the desired area is reached, following which the storage of the tabulator word in the manner previously described, is repeated.

To effect cancellation of individual tabulator marks, the writing mark SM is shifted along the line Z16 to the specific column in which is located the tabulator mark HT which is to be cancelled. The tabular key tabulator cancel is actuated and a corresponding order is thereby supplied to the register 2. Thereafter, by means of the counter 17 and register 18, while switch positions 22b and 23 are set, a signal is supplied to the control stage 4 which effects cancellation of the tabulator word within the cells of the image repetition store 10. Cancellation of the tabulator word is effected as a result of the release of signals over the contact 23d whereby the two gates 5 and 6 are blocked. Consequently during this time period no new symbol word is written into the image repetition store.

In the event it is desired that all tabulated marks be cancelled, in addition to a key tabulator cancel, a key "tabulator line" may be actuated. Switch positions 22b or 23b are thereby set whereby during the release of signals over contact 23b, the two gates 5 and 6 are blocked, thus preventing tabulator words from being displayed in the first line Z1.

Occasionally it is desirable to effect a cancellation of all symbols A, B, C, D, etc. displayed on the screen, with the exception of the tabulator marks. For this purpose, the keyboard may be provided with a key "picture cancellation" which, when activated, effects a cancellation of all symbols illustrated in the lines Z2 to Z16 while retaining display of the tabulator marks in line Z1. For this purpose, the switch positions 22b and 23b are set whereby the signal released over contact 23d prevents cancellation of the tabulator marks displayed in line Z1.

Figure 3:
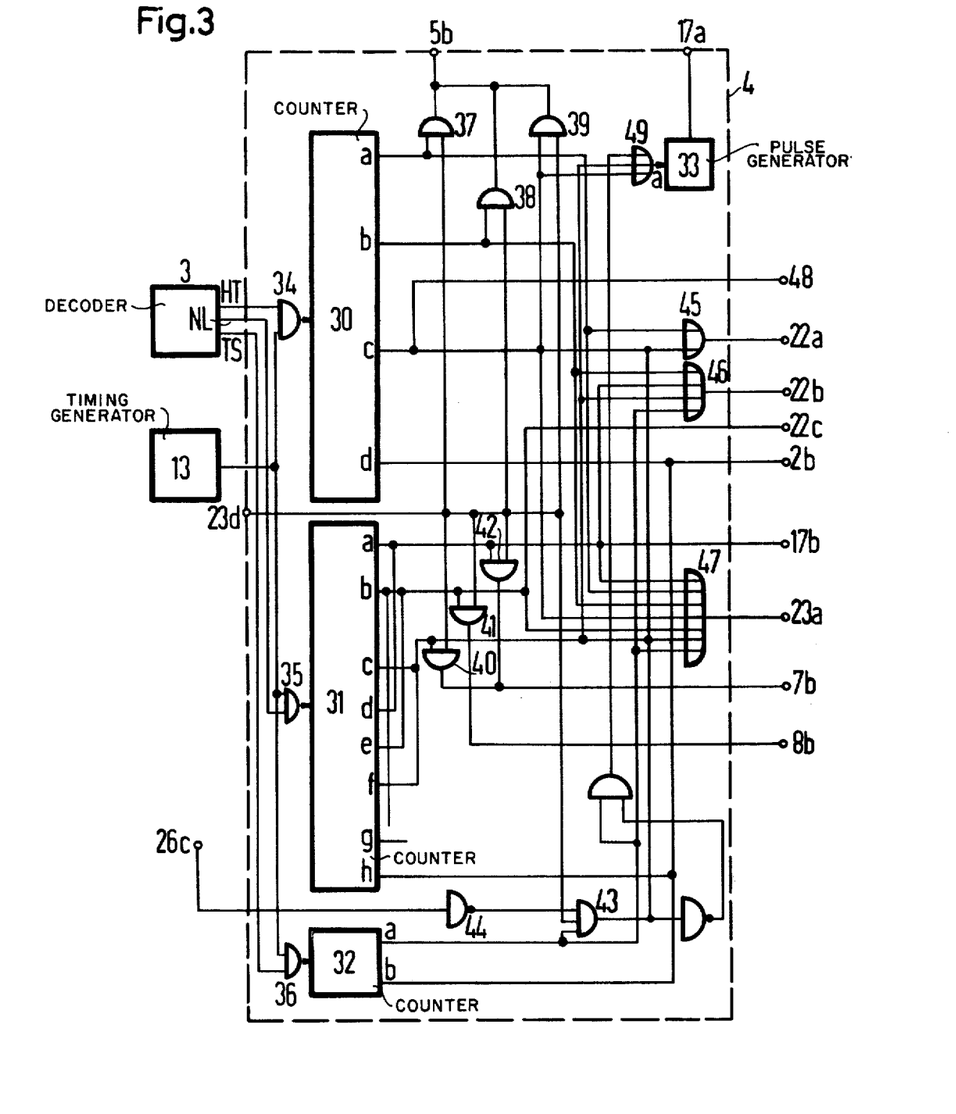
FIG. 3 illustrates in greater detail the control stage, illustrated, in block form, in FIG. 1.

FIG. 3 illustrates details of the control stage 4 of FIG. 1, in which for simplicity, illustration of only those components which are pertinent to the present invention are included, and which include counters 30, 31, 32, pulse generator 33, AND gates 34 to 43, NOT gate 44, and OR gates 44, 46, 47 and 49. The decoder 3 continuously checks whether special order words HT, NL, TS are fed from the register 2 (illustrated in FIG. 1) and releases signals over the outputs designated HT, NL, TS. In addition, signals are continuously released by the timing generator 13.

Initially, there is described the situation in which the tabulator marks are displayed in the first line Z1 as well as in the line Z16 of the screen illustrated in FIG. 2. With this prerequisite, the decoder 3 releases a signal over the output HT and in conjunction with the signal supplied by the timing generator 13, the gate 34 releases a signal to the counter 30, in response to which the latter releases signals over the outputs a, b, c and d.

The signal released over the output 30a is conducted over gates 45 or 47 respectively to the inputs 22a or 23a respectively, whereby as previously described, the switch positions 22a or 23a respectively are set and a single area of line Z16 addressed. In the event the addresses which are set, on the one hand by the means of counters 15 and 16, and on the other hand by means of counter 17 and the register 18, coincide, a signal is released over contact 23d to gate 37 (illustrated in FIG. 3) and a signal is conducted to the input 5b which opens gate 5 and enables the storage, of the tabulator words in register 2, into the image repetition store 10. It is here and subsequently impliedly assumed that the other gates are closed and special signals are not released effecting their opening. Consequently, the tabulator mark is displayed in a predetermined area of the screen of the cathode beam tube.

When releasing a signal over the output 30b to the gates 46 or 47 respectively, the switch positions 22b or 23a respectively are set. The address of the area is thereby set which, on the one hand is located in the line Z1, and on the other hand on the column which is set by means of counter 17. If both addresses coincide, a signal is directed over the contact 23d and gate 38 to the input 5b so that gate 5 is open and the tabulator word is entered in the image repetition store 10 which corresponds to an area in line Z1 and in the column which has thus been set. Consequently, the tabulator mark is displayed in one area of each of the lines Z16 and Z1.

With the release of a signal over the output 30c, the switch position 22a or 23a respectively will be set over gate 45 or 47 respectively, whereby the area in line Z16 is addressed.

The pulse generator 33 is also connected to the output 30c, whereby the generator releases counting pulses to the input 17a of the counter 17, as long as the signal is supplied to the input 33a. The signal released over the output 30c effects the release of a counting pulse to the input 17a whereby the counter reading of the counter 17 is increased by one unit. The writing mark thus is shifted, by one area, to the right. A signal is released over gate 39, to open gate 5 if the addressed area is reached. In addition, a signal is released over the counter 48, which, is a generally known way, displays a writing mark in the next area.

The tabulator words stored in register 2 are cancelled in the presence of a signal at the output 30d. A tabulator mark is illustrated in lines Z1 and Z16, and in addition, in line Z16, the writing mark SM is illustrated next to the tabulator mark at the right side thereof.

There will now be explained in greater detail, the manner in which all tabulator words correspond to the tabulator marks are stored at those points of the image repetition store 10 which correspond to the second line Z2, prior to the display of the symbols in the preceding line. Under these circumstances, a signal is released over the output NL of the decoder 3 and over the output of the pulse generator 13, which are conducted to the gate 35, which in turn supplies a signal to the input of the counter 31. The counter 31 thereafter consecutively releases signals automatically over the output a, b, c, d, e, f and g, which perform control functions in a similar manner to the signals released by the counter 30. The presence of a signal at the output 31a effects, over gates 46 and 47, a setting of switch positions 22b and 23a. Simultaneously, the counter 17 is reset over input 17b, the area S1/Z1 thus is addressed and by utilizing the signal which appears at contact 23d, a signal is directed over gate 42 to the input 7b whereby a tabulator word is stored in a register 14, corresponding to the address of area S1/Z1.

A signal appearing at the output 31b effects a setting of switch positions 22c and 23a whereby the area S1/Z2 is addressed. Utilizing a signal appearing at contact 23d and gate 41, opening of gate 8 is effected and a tabulator word which might be stored in register 14 is entered in the image repetition store 10.

A signal appearing at output 31c is conducted to gates 46 and 47, effecting a setting of swich positions 22b and 23a. In addition, pulse generator 33 receives a signal and releases a counting pulse at the input 17a so that the area S2/Z1 is now addressed. Further, the signals at the output 31c and contact 23d, by means of the gate 40 releases a signal over terminal 7b, whereby gate 7 is opened so that a tabulator word possibly stored in the image repeat storer is entered over gate 7 into the register 14.

The signals released over the outputs 31d, 31e or 31f respectively, are in each case directed back to the lines which are connected with the output 31a, 31b and 31c respectively so that all operations are repeated with increased addresses.

As a result of the signals released over the outputs 31d, 31e and 31f, and the signals which are released over further outputs, not provided with designations, all tabulator words of the line Z1 are temporarily stored in sequence in the register 14 and are subsequently stored in the cells of the image repetition store 10 which correspond to the line Z2. Each of the columns S1, S2, S3 . . . S80, is provided with an output of the counter 31. After the signal has been conducted back to the output 31g to the line which is connected with the output 31c, and after the control associated therewith have been effected, the last signal is released over output 31h, which is conducted to the input 2b whereby the tabulator word, thus far stored in register 2, is cancelled and the latter is ready for the acceptance of additional words.

When the key "tabulator advance" is actuated, the address of the cell of the image repetition store 10, corresponding to the next tabulator mark in line Z1, is searched. For this purpose a signal is released at the output TS of the decoder 3 which, in conjunction with a pulse from the timing generator 13, provides a signal over gate 36 at the switching stage 32 whereby the latter releases signals over the outputs 32a and 32b thereof in timed sequence.

A signal at the output 32a sets switch positions 22b and 23a, and in addition, the pulse generator 33 receives a signal over gate 49, whereby counter 17 continuously receives counting pulses over input a. A released tabulator word is determined by the decoder 26 and a corresponding signal is released from terminal 26c to gate 44. If a signal is also present at point 23d, a signal is released at gate 43 which indicates that in the line Z1 a tabulator mark has been reached. In addition thereto, the signal released over gate 43 is conducted to input a of counter 17, thereby stopping the supply of counting pulses. The contents of register 2 is subsequently cancelled by a signal conducted from the output 32b. Thereafter, the writing mark SM is automatically shifted within the line Z16 up to the column in which the tabulator mark in line Z1 is displayed. This operation is effected by the setting of switch position 22a and displaying the writing mark SM, as previously described on the screen of the cathode beam tube 12.

The tabulator marks HT, illustrated in FIG. 2, can be displayed continuously in line Z1 and temporarily in line Z16. In connection with this alteration of the method, it would be feasible to write the tabulator marks in line Z16 and to carry them over, one by one, into the preceding lines. In this case, the tabulator marks HT each require an area S/Z of the screen and each a corresponding storage space in the image repetition store 10. Consequently, this method can, in particular, be enlarged if the screen is relatively large and if the image repetition store 10 has a sufficiently large capacity as to the number of words which can be stored.

If the symbols are not displayed according to the rolling-page method but for example, linewise consecutively from the top to the bottom, the tabulator marks HT can also be displayed. For example, the upper line Z1 or the bottom line Z16 can be reserved for the tabulator marks HT or the tabulator marks can, if desired, be written in all lines.

Figure 4:
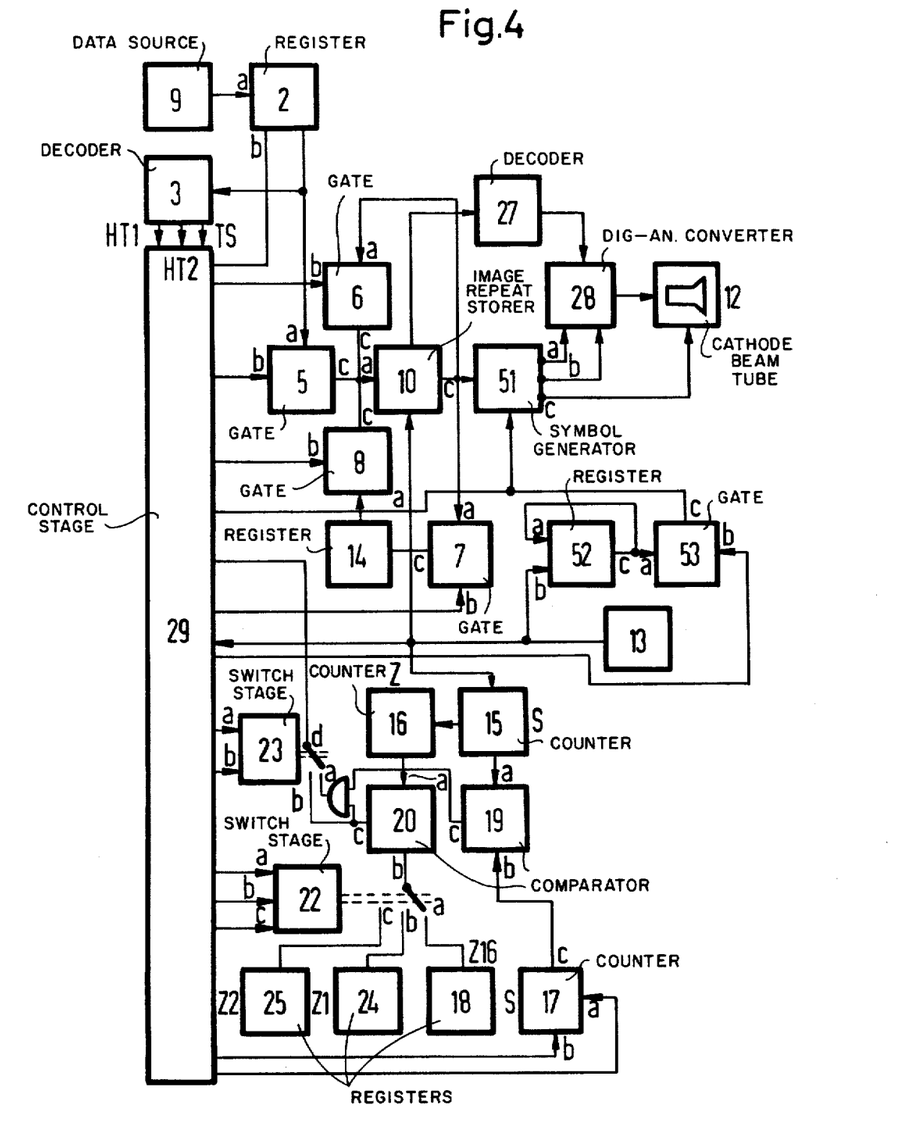
FIG. 4 illustrates a circuit arrangement, similar to FIG. 1, for the illustration of symbols, in tabulated arrangement, on the screen of a data-video device, in which the individual area of the screen may illustrate either alphanumerical symbols or tabulator marks, or alphanumerical symbols in addition to tabulator marks.

Thus far it has been assumed that the symbol generator, illustrated in FIG. 1, can write, in a generally known manner, either a symbol, for example the symbols A, B, C, D, or a tabulator mark HT. In order to conserve space on the screen, it may be desirable to display in one of the areas S/Z symbols as well as tabulator marks HT. FIG. 4 illustrates a block diagram of a circuit arrangement which makes this possible.

The circuit of FIG. 4 generally corresponds to that of FIG. 1, but instead of the symbol generator 11, there is provided a symbol generator 51 which is capable of so controlling the cathode beam 12, that in one area an alphanumerical sign, as well as a tabulator mark, can be displayed. In addition, FIG. 4 includes a register 52, gate 53, and employs a control stage 59 in lieu of control stage 4 of FIG. 1.

The register 52 enables the storage of 81 bits, which are released over the output $c$ thereof, in a manner similar to a shift register, and conducted back to the input $a$ thereof with the input $b$ thereof being supplied with pulses from timing generator 13, which function as shift pulses. The bits stored in the register 52 are each assigned to one column of the screen illustrated in FIG. 2 and each have a 1-value if a tabulator word is to be displayed in the assigned column. The gate 53 is controlled over input $b$ and in unblocked condition conducts signals from input $a$ to output $c$. The gate 53 can be opened over input 52b, in particular during the duration of individual lines, during the duration of all lines, or also only during the duration of individual areas, with the control signals necessary therefor being supplied over the input 53b.

Figure 5:
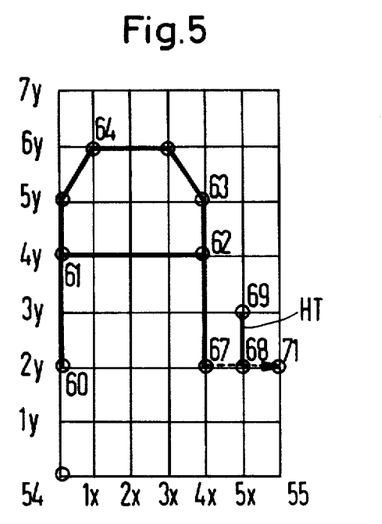
FIG. 5 illustrates a single individual area illustrating a symbol and tabulator mark therein.

Before discussing the circuit of the symbol generator 51 in detail, it is believed that an explanation of the display of a symbol on the screen of tube 12 be presented, utilizing the disclosure of FIG. 5, which illustrates one of the areas S/Z, disclosed in FIG. 2, with the symbol A and the tabulator mark HT being displayed in such area. Beginning with the reference point 54, which is assigned to the illustrated area, the distances $1x$, $2x$, $3x$, $4x$, $5x$, up to the next reference point 55 are depicted on the abscissa and in like manner, the distances $1y$, $2y$, $3y$, $4y$, $5y$, $6y$, $7y$, are depicted on the ordinate.

The desired symbol is written by the electron beam along the indicated lines, point to point, beginning with the point 60, from which it is directed sequentially to the points 61, 62, 63, 64, 61, 62, 67, 68, 69, 71. The next symbol will then be written, with reference to point 55.

Figure 6:
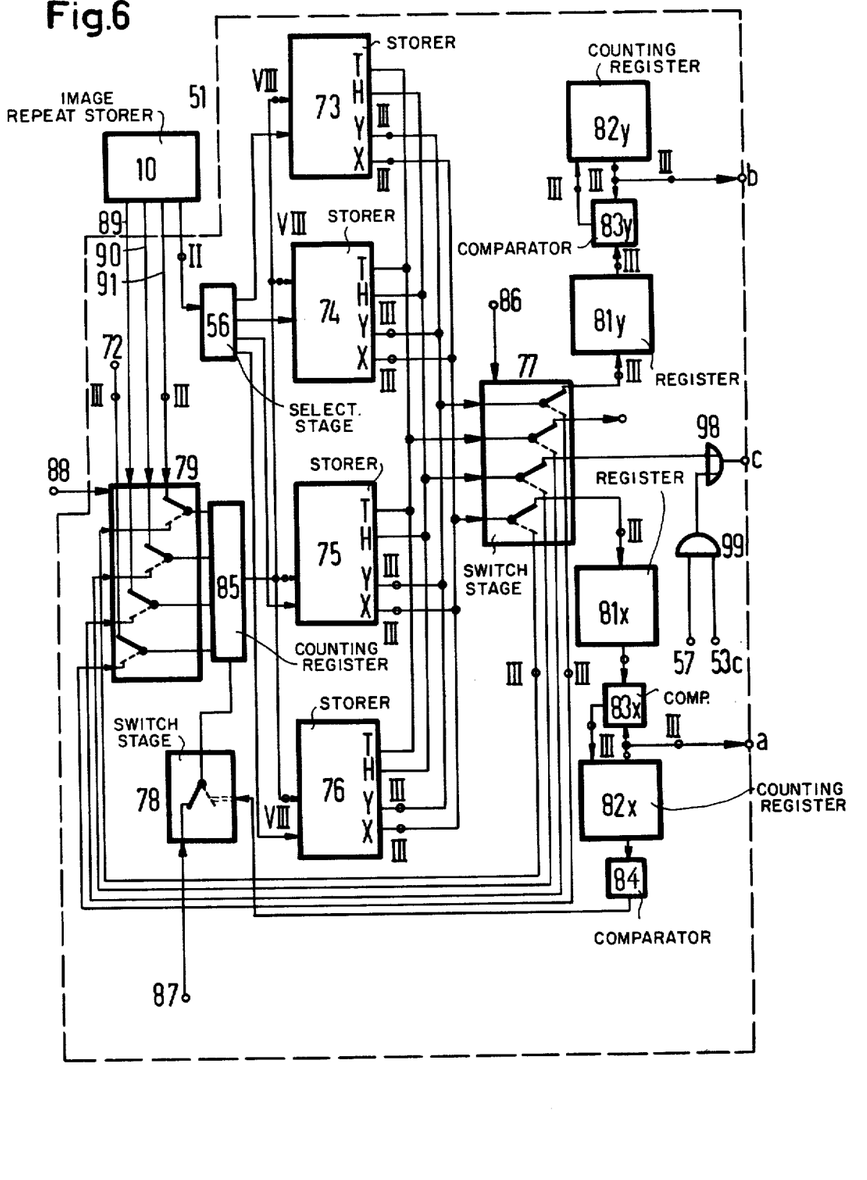
FIG. 6 is a circuit diagram, in block form, of a symbol generator.

FIG. 6 illustrates a circuit diagram, in block form, of the symbol generator 51, illustrated in FIG. 4, which comprises a selection stage 56, stores 73, 74, 75 and 76, switching stages 77, 78 and 79, registers 81x, 81y, counting registers 82x, 82y, comparator circuits 83x, 83y, and additional counting register 85, comparator circuit 84, gates 98, 99, and a plurality of connecting lines. For the purposes of simplicity and clarity, parallel connecting lines are illustrated merely by a single line which is circled and accompanied by Roman numerals, adjacent the circles, which indicate the number of individual parallel lines involved.

The stores 73–76 are provided with address stages (not illustrated) which select certain words in dependency upon the data initially supplied. The first 32 words of each of the stores 73–76 are each assigned to a symbol and store substitution addresses, among which additional data is stored for the illustration of the respective symbols.

The following table illustrates the designation of respective substitution addresses.

|     | 4x | 2x | 1x | 4y | 2y | 1y | H | T |
|-----|----|----|----|----|----|----|----|----|
| 61a | 0 | 0 | 0 | 1 | 0 | 0 | 1 | 1 |
| 62a | 1 | 0 | 0 | 1 | 0 | 0 | 1 | 1 |
| 63a | 1 | 0 | 0 | 1 | 0 | 1 | 1 | 1 |
| 64a | 0 | 0 | 1 | 1 | 1 | 0 | 1 | 1 |
| 65a | 0 | 0 | 0 | 1 | 0 | 0 | 1 | 1 |
| 66a | 1 | 0 | 0 | 1 | 0 | 0 | 0 | 1 |
| 67a | 1 | 0 | 0 | 0 | 1 | 0 | 1 | 1 |
| 68a | 1 | 0 | 1 | 0 | 1 | 0 | 0 | 1 |
| 69a | 1 | 0 | 1 | 0 | 1 | 1 | 1 | 1 |
| 70a | 1 | 0 | 1 | 0 | 1 | 0 | 0 | 1 |
| 71a | 1 | 1 | 0 | 0 | 1 | 0 | 0 | 0 |

Reference numeral 61a designates such a substitution address, with reference numerals 62a, 63a, 64a, 65a, 67a, 68a, 69a, 70a, and 71a referring to further addresses which are formed from the initial substitution address by successive step-like increases of one. The columns $4x$, $2x$, $1x$, $4y$, $2y$ and $1y$ refer to the coordinates depicted in FIG. 5. The column designated H refers to the brightness or intensity of the cathode beam, and the column designated T refers to control signals. The 0-values and 1-values which are stored under the substitution address 61a as set forth in the table, are the desired coordinates of point 61, in digital representation. The outputs of the stores 76—76 (FIG. 6) are designated by the letters T, H, Y and X as these outputs respectively control the signal T, the brightness signal H, and the coordinates Y and X which are released, as data, in binary form.

The switching stages 77, 78 and 79 include control stages for the control of the illustrated switches and receive control pulses over the terminal points 86, 87 and 88. Registers 81x, 81y and the counting registers 82x, 82y may be designed for three bits each and thus contain three stages, and store three digital binary numbers. The comparators 83x and 83y compare the binary numbers supplied to them and release signals over their outputs which contain the information that one of the two binary numbers is smaller, equal to, or larger, respectively, than the other binary number.

The functioning of the symbol generator illustrated in FIG. 6 will now be explained on the basis that the symbol word, supplied by the image repetition storer 10 is that assigned to the symbol A. With a first pulse, the store 75 is selected by means of selection stage 56 and is prepared for the entry of additional data. In addition, with such first pulse, the five bits, characterizing the symbol A, are supplied over lines 89, 90 and 91 to the input of the storer 75. Also, with such first pulse, three 0-signals are conducted over terminal point 72. The addressing stage of the store 75 recognizes by the 0-signals that one of the first 32 addresses is concerned, and by means of the additional five bits, recognizes that the symbol A is involved.

Based upon this symbol address, the substitution address 61a (see table) is released as the first word over the outputs of the store 75. This substitution address 61a is conducted from the outputs of the store 75 to the inputs thereof over switching stage 77, switching stage 79 and counting register 85. With the third pulse, the second word which is stored under the substitution address 61a is released, together with the data, which can be ascertained from the table, over the outputs of the store 75 and is conducted over switches of the switching stage 77, set in positions fully illustrated in FIG. 6.

From the third pulse on, the substitution address 61a is always increased by one, employing the counting register 85, so that during the following pulses the addresses 62a to 71a are directed to the input of the store 75. Correspondingly, the words, as ascertained from the table, are successively released one after the other to the registers 81x and 81y. By means of the registers 81x and 81y, counting registers 82x, 82y, comparators 83x, 83y, and the digital-analog converter 28 (illustrated in FIG. 4), the symbol A is written from point 61 to point 67 while the tabulator mark HT is written from point 68 to point 69.

The brightness or intensity of the cathode beam of the tube 12 is controlled by a brightness signal which is conducted from output c of the symbol generator 51 over a suitable amplifier (not illustrated), thereby suitably controlling the intensity of the cathode beam. Thus, on the one hand, in the event a 1-signal is released over the outputs H of the stores 73 to 76 to the OR-gate 98, the beam will as at high intensity to display the symbol A, is illustrated in FIG. 5, or any of the other alphanumerical and possibly also graphic symbols are displayed. On the other hand, a line is always written at high intensity if a 1-signal is present at the output of the AND-gate 99 and supplied to the second input of the OR-gate 98. Thus, the display of the tabulator mark HT is displayed from point 68 to point 69. The AND-gate 99 always releases a 1-signal if a 1-signal is present at the output c at the gate 53 (see FIG. 4) and simultaneously a 1-signal is conducted over terminal point 57. A pulse signal appears at such point periodically during the time in which the cathode beam travels in each area from point 68 to point 69.

By utilization of the circuit arrangement illustrated in FIG. 4, the symbols and tabulator marks can basically be written in accordance with the rolling-page method. However, the symbols also can be written linewise successively from top to bottom, whereby, in particular, in the individual areas of the screen only tabulator marks but no other alphanumerical symbols can be written. This can be effected by releasing a tabulator word from the image repetition store 10, which merely causes the beam of the cathode beam tube 12 to write the line from point 68 to point 69.

Figure 7:
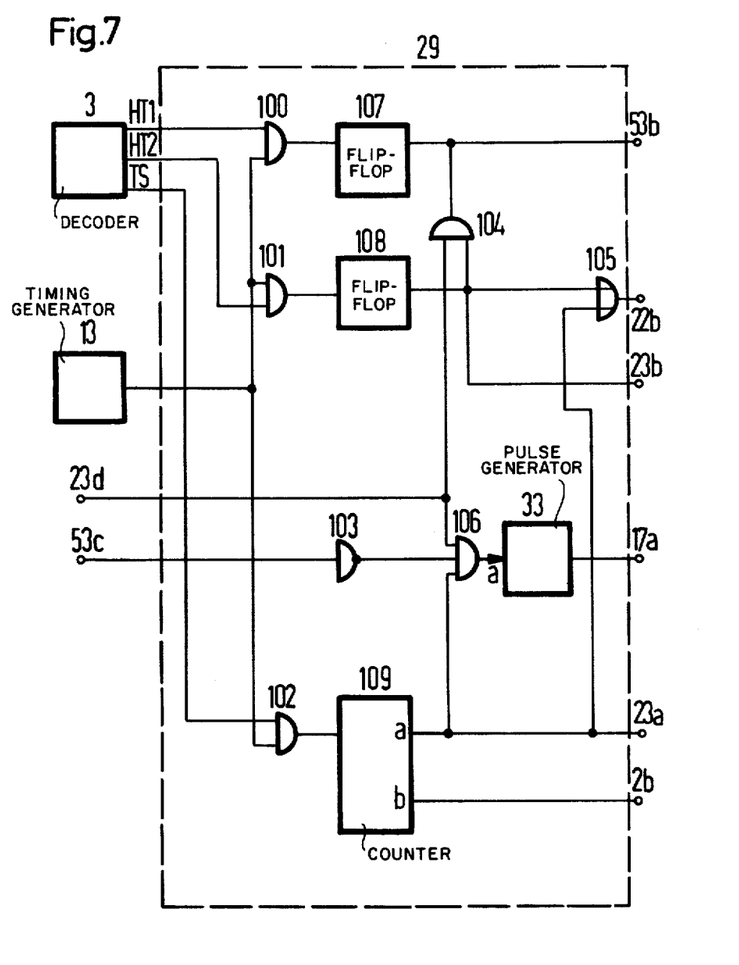
FIG. 7 illustrates in greater detail the control stage illustrated, in block form, in FIG. 4.

FIG. 7 illustrates, in detail, the control stage 29, schematically illustrated in FIG. 4. It comprises gates 100 to 106, bistable flip-flops 107, 108, counter 109, and pulse generator 33. Only those elements are illustrated which are pertinent to the present invention. The decoder 3 continuously checks whether special order words HT1, HT2, TS are released by the register 2 (illustrated in FIG. 4), and releases signals over the correspondingly designated outputs.

Initially will be described the case in which the tabulator marks are to be written in all areas of a particular column, for example, column S4. It is assumed that the tabulator store 52 (illustrated in FIG. 4) is suitably filled and that the fourth of its 81 bistable flip-flops exhibits a "1" condition, whereas all other flip-flops exhibit a "0" condition. With the presence of the order signal HT1 a signal is conducted to the flip-flop 107 over the output of gate 100, whereby the output of the flip-flop is changed from its 0 condition to its 1 condition and releases at its output a 1-signal which is conducted to the input 53b of gate 53. As the information stored in the tabulator store 52 circulates linewise, all 1-values are conducted to the symbol generator 51 when the cathode beam is directed into areas of column S4. Cancellation of such tabulator marks takes place if flip-flop 107 is, in generally known manner, reset into its 0 condition so that a 0-signal is conducted to the input 53b of blocking gate 53.

If tabulator marks are to be displayed only in one line, for example line Z1, a signal is conducted from output HT2 of the decoder 3 over gate 101 to the flip-flop 108, initially in its 0 condition, and which is thereby shifted into its 1 condition to release a signal over gate 105, whereby switch positions 22b and 23b are set. Thus, the line Z1 is addressed and gate 53 is opened over gate 104 during the writing of the line Z1. Cancellation of such tabulator marks may again be effected by resetting the flip-flop 108, in generally known manner, to its original 0 condition.

Automatic tabulator-transport of the writing mark of the order word tabulator advance TS is supplied from the corresponding output of the decoder 3 to the counter 109 over gate 102, with the counter 109 thereafter releasing signals over its outputs 109a and 109b in timed sequence. The signal released over output 109a is operative to set switch positions 22b and 23a whereby the individual areas of the line Z1 are addressed in a timed sequence. A corresponding signal is also conducted over contact 23d to gate 106 and in addition a signal is supplied from output 53c over the NOT gate 103 to the gate 106, which indicates that no 1-value is supplied to the symbol generator 51. In addition, the output 109a is connected to the third input of the gate 106 whereby a signal is released at the output of gate 106 in the event 1-signals are present at all three inputs of such gate, with the output signal being conducted to pulse generator 33 which, over input 17a, effects an increase in the counting reading of the counter 17, thus effecting an address increase in column direction and thereby effecting a setting of the address of the next area, for display of the following symbol. The contents of the register 2 are cancelled over the output 109b.

Having thus described my invention, it will be obvious that various minor modifications might be suggested by those versed in the art, and it should be understood that I wish to embody within the scope of the patent warranted hereon all such embodiments as reasonably and properly come within the scope of my contribution to the art.

I claim as my invention:

1. A method for the display of symbols, in tabulated form, on the screen of a data-video device whereby symbol words, corresponding to the symbols, are released by a data source, and display of the symbols effected by utilization of an image repetition store and a symbol generator, comprising the successive steps of:
   I. inserting a writing mark word from the data source in the image repetition store and displaying a writing mark corresponding to the writing mark word upon the picture screen,
   II. inserting an order word tabulator set from the data source in the form of a tabulator word, into that cell of the image repetition store in which the previously inserted writing mark word was stored,
   III. continuously supplying data from the picture repetition store to the symbol generator whereby the latter provides symbols and a tabulator mark corresponding to the tabulator word, to the picture screen for display thereon, IV. feeding an order word tabulator advance from the data source, and with utilization of a decoded ascertaining the location in the image repetition store of the next tabulator mark, and thereafter displaying a writing mark in the corresponding column so ascertained.

2. A method according to claim 1, wherein said next tabulator mark is located by effecting a continuous increase of the address of one writing mark in column direction, and deriving a signal terminating the continuous increase of the address by a signal at the displayed tabulator mark.

3. In a circuit arrangement for selectively depicting symbols in tabulated arrangement upon the picture screen of a data-video device, utilizing tabulator marks visually displayed on such picture screen, the combination of a data source, a continuously operating image repetition store, a symbol generator, means in the data source for storing data by means of which designation may be effected of an area of the screen in which a tubular mark is to be displayed, a register in which is received data from the data source and from which data may be supplied to the image repetition store, counting means operatively connected to said image repetition store for counting lines and columns of the picture screen, representing the addresses of the storage point of the image repetition store, further counting means in which the counting results are adjustable, and means for effecting a comparison between the counting results of said first mentioned counting means and said adjustable counting means, operative over a gate, upon the existence of coinciding counting results to release an address signal for effecting entry of the corresponding tabulator word into the image repetition store, from which display of the tabulator mark may be effected.

4. A circuit arrangement according to claim 3, comprising in further combination, a program unit, an additional decoder to which the symbol words and the order words from the register are supplied, operative, in the presence of an existing tabulator order to release a tabulator signal to said program unit, whereby the latter controls the timing of the writing of the tabulator words in dependency upon the address signal.

5. A circuit arrangement according to claim 4, comprising in further combination, a further program unit operatively connected to the image repetition store and said further decoder operative to control the timing of the tabulator words from the point of the image repetition store, corresponding to the first line, to the point corresponding to the second line, said further decoder being operable to supply a signal to said further program unit operative to effect a restorage of the tabulator word.

6. A circuit arrangement according to claim 5, comprising a tabulator store in the form of a circulating memory, in which is stored information for all areas of the video screen in which a tabulator mark may be displayed, with the data in such store being circulated with the words released by the image repetition store.

7. A circuit arrangement according to claim 6, wherein a symbol generator is operative to create deflection signals for effecting travel of the cathode beam along the points defining a symbol, and also along the points defining a tabulator mark, and fixed value store means for controlling the intensity of the cathode beam during the writing of the symbols, and also for storing the coordinates of the symbols to be written, said tabulator store being operative to control the intensity of the cathode beam during the writing of the tabulator marks.

8. A circuit arrangement according to claim 6, wherein the output of the tabulator store is connected over a gate with the symbol generator, operative to determine the line into which the tabulator mark is written.

9. A method for the display of symbols, in tabulated form, on the screen of a data-video device whereby symbol words, corresponding to the symbols, are released by a data source, and display of the symbols effected by utilization of an image repetition store and a symbol generator, in which the symbols are shifted upwardly, line-by-line, in accordance with the rolling-page method, with new symbols being written into the last line of the picture screen, comprising the steps of:

I. inserting a writing mark word, from the data source, in the image repetition store and displaying a writing mark corresponding to the writing mark word upon the picture screen, II. inserting an order word tabulator set from the data source, in the form of a tabulator word, into that cell of the image repetition store in which the previously inserted writing mark word was stored, III. continuously supplying data from the picture repetition store to the symbol generator, whereby the latter provides symbols, and a tabulator mark corresponding to the tabulator word, displaying such tabulator mark in the last line as well as in the first line of the picture screen, IV. storing, shortly before the transfer of the symbols into the next higher line, the then existing tabulator values into those locations corresponding to the then second line, V. displaying all symbols of the second through the last line in the respective next line thereabove, VI. feeding an order word tabulator advance from the data source, and with utilization of a decoder, ascertaining the location, in the image repetition store of the next tabulator mark, and thereafter displaying a writing mark in the corresponding column so ascertained.

10. A method according to claim 9, comprising feeding the tabulator words from the data source into a register, and counting means, the counting readings of which correspond to the addresses of the storage points of the image repetition store, further counting means being provided in which the count is adjusted, by means of which with said first counting means the addresses of the last line are set and the tabulator word is fed from the register into the image repetition store and setting the address of the first line, by means of said first and second counting means, and writing the tabulator word into the storage cell of the image repetition store which corresponds to the first line of the screen.

11. A method according to claim 9 comprising effecting a storage of the tabulator words in a further register which is connected over a gate with the output of the image repetition store, and storing the tabulator words in the further register at those points of the image repeat storer corresponding to the second line.

12. A method according to claim 9, comprising storing information for all areas of the video screen, in which a tabulator mark may be displayed, in a tabulator store in the form of a circulating memory, and circulating the data in the tabulator store with the words released by the image repetition store.

13. A method according to claim 12, comprising deflecting the cathode beam to effect travel thereof along the points defining a symbol, and also along the points of a tabulator mark, in accordance with signals created in the symbol generator, controlling the intensity of the cathode beam during the writing of the symbols by fixed value store means, which also stores the coordinates of the symbols to be written, and controlling the intensity of the cathode beam during the writing of tabulator marks by means of the tabulator.

* * * * *